US008790062B2

(12) United States Patent
Lanigan, Sr. et al.

(10) Patent No.: US 8,790,062 B2
(45) Date of Patent: Jul. 29, 2014

(54) DISTRIBUTION SYSTEM

(75) Inventors: John J. Lanigan, Sr., Orland Park, IL (US); Peter W. Mirabella, Schererville, IN (US); John Lanigan, Jr., New Lenox, IL (US); Myron Glickman, Arlington Heights, IL (US); Richard Marec, Romeoville, IL (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 1403 days.

(21) Appl. No.: 12/080,049

(22) Filed: Apr. 1, 2008

(65) Prior Publication Data
US 2009/0245990 A1    Oct. 1, 2009

(51) Int. Cl.
B66F 9/06    (2006.01)

(52) U.S. Cl.
USPC ........................................................ 414/592

(58) Field of Classification Search
USPC .......... 414/267, 331.01, 331.14, 331.15, 458, 414/459, 495, 539, 589, 227, 228, 229, 233, 414/234, 236, 239, 241, 249, 252, 253, 254, 414/564, 785, 744.1, 592; 296/16, 18; 104/172.2; 244/114 R
See application file for complete search history.

(56) References Cited

U.S. PATENT DOCUMENTS

| | | | |
|---|---|---|---|
| 1,207,237 A | 12/1916 | Stuart | |
| 1,783,363 A | 12/1930 | Grob | |
| 2,579,688 A * | 12/1951 | McCormick | 187/212 |
| 2,892,554 A | 6/1959 | Decker | |
| 2,934,373 A | 4/1960 | Doty, Jr. | |
| 2,958,538 A | 11/1960 | Norris et al. | |
| 3,119,503 A | 1/1964 | Herpich et al. | |
| 3,135,407 A | 6/1964 | Samuel | |
| 3,208,608 A | 9/1965 | Tantlinger et al. | |
| 3,314,655 A | 4/1967 | Steele | |
| 3,415,490 A | 12/1968 | Steele | |
| 3,520,433 A | 7/1970 | Blackburn | |
| 3,700,128 A | 10/1972 | Noble et al. | |
| 3,807,582 A * | 4/1974 | Anderson | 414/141.3 |
| 3,891,100 A | 6/1975 | Tamaki et al. | |
| 4,076,134 A | 2/1978 | Landow | |
| 4,093,084 A | 6/1978 | Ringer | |
| 4,139,107 A | 2/1979 | Ninomiya et al. | |
| 4,221,536 A * | 9/1980 | McFee | 414/812 |
| 4,431,359 A * | 2/1984 | Toniolo | 414/139.9 |
| 4,522,546 A | 6/1985 | Ringer | |

(Continued)

OTHER PUBLICATIONS

John Zumerchik et al., "Automated Transfer Management Systems and the Intermodal Performance of North American Freight Distribution," Journal of the Transportation Research Forum, pp. 59-76, Fall 2009.

(Continued)

*Primary Examiner* — Saul Rodriguez
*Assistant Examiner* — Glenn Myers
(74) *Attorney, Agent, or Firm* — McCracken & Frank LLC

(57) ABSTRACT

A distribution system (100) is disclosed. The system includes the steps of: providing (105) a multi-level pathfinder with a containment cavity having a ground level cell and an elevated level cell; configuring (110) the containment cavity to receive containers; and loading (115) the containment cavity with a first container and moving the first container vertically to allow a second loading of a second container. This system provides a simple, robust and efficient automatable buffer to load and unload, a container between a chassis and rail or port terminal and/or at distribution hub.

20 Claims, 14 Drawing Sheets

(56) References Cited

U.S. PATENT DOCUMENTS

| | | | |
|---|---|---|---|
| 4,522,550 A | | 6/1985 | Whitehouse |
| 4,915,576 A | | 4/1990 | Lanigan et al. |
| 5,297,908 A | * | 3/1994 | Knott ............................. 410/26 |
| 5,378,105 A | * | 1/1995 | Palko ............................ 414/540 |
| 5,505,585 A | | 4/1996 | Hubbard |
| 5,511,927 A | | 4/1996 | Lanigan et al. |
| 5,540,532 A | * | 7/1996 | Carder et al. ................. 414/284 |
| 5,622,466 A | * | 4/1997 | Rossato ........................ 414/228 |
| 5,857,821 A | | 1/1999 | Wiedeck |
| 6,030,168 A | | 2/2000 | Kroll et al. |
| 6,168,366 B1 | * | 1/2001 | Horn ........................ 414/416.03 |
| 6,190,107 B1 | | 2/2001 | Lanigan et al. |
| 6,318,947 B1 | | 11/2001 | Hahn et al. |
| 6,439,128 B1 | | 8/2002 | Miller et al. |
| 7,123,132 B2 | | 10/2006 | Heidenback et al. |
| 7,704,032 B2 | | 4/2010 | Rash et al. |
| 7,779,604 B2 | | 8/2010 | Kapelski |
| 2003/0061085 A1 | | 3/2003 | Lanigan, Sr. |
| 2005/0244254 A1 | | 11/2005 | Schratt et al. |
| 2006/0045659 A1 | | 3/2006 | Hubbard, Sr. |
| 2006/0104755 A1 | * | 5/2006 | Clive-Smith ................. 414/227 |
| 2006/0115353 A1 | * | 6/2006 | Berends et al. ............... 414/458 |
| 2006/0245879 A1 | | 11/2006 | Lockamy et al. |
| 2006/0251498 A1 | | 11/2006 | Buzzoni et al. |
| 2006/0269379 A1 | | 11/2006 | Orr et al. |
| 2008/0141895 A1 | | 6/2008 | Lanigan et al. |
| 2008/0166211 A1 | | 7/2008 | Lanigan et al. |
| 2008/0213067 A1 | | 9/2008 | Jegers |
| 2008/0219804 A1 | | 9/2008 | Chattey |
| 2008/0219827 A1 | | 9/2008 | Lanigan et al. |
| 2008/0243301 A1 | | 10/2008 | Lanigan et al. |
| 2008/0298939 A1 | | 12/2008 | Lanigan et al. |
| 2009/0003985 A1 | | 1/2009 | Lanigan et al. |
| 2010/0119338 A1 | * | 5/2010 | Webster et al. ............... 414/239 |

OTHER PUBLICATIONS

Nathan Huynh et al., "Analysis of Stacking Priority Rules to Improve Drayage Operations Using Existing and Emerging Technologies," Transportation Research Record-Journal of the Transportation Research Board, pp. 1-8, Mar. 2010.

John Zumerchik et al., "An Analysis of Current Freight Performance Metrics and the Need for System-Wide Efficiency Metrics," submitted for consideration of presentation at the 91st Annual Meeting of the Transportation Research Board and Publication in the Transportation Research Record, pp. 1-16, submission Jul. 31, 2010.

Jean-Paul Rodrigue, "The Thruport Concept and Transmodal Rail Freight Distribution in North America," Journal of Transport Geography vol. 16, pp. 233-246, 2008.

Jack Lanigan, Sr. et al., "Next Generation Intermodal Terminals: Prospects for Improving Train and Truck Turn Times," pre-publication, pp. 1-15, Sep. 2009.

John Zumerchik et al., "Sustainable Intermodal Rail Terminals: Cost Functions for Conventional and Advanced Terminals," pp. 1-2, Dec. 2009.

Jack Lanigan, Sr., et al. "Shared Intermodal Terminals and the Potential for Improving the Efficiency of Rail-Rail Interchange," Transportation Research Board Committee on Intermodal Freight Terminal Design and Operations (AT050), pp. 1-17, 2007.

* cited by examiner

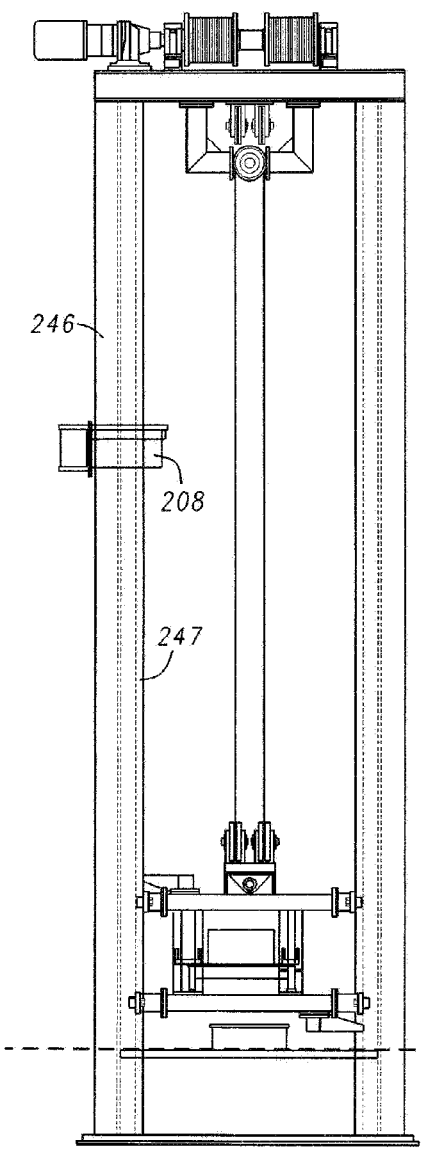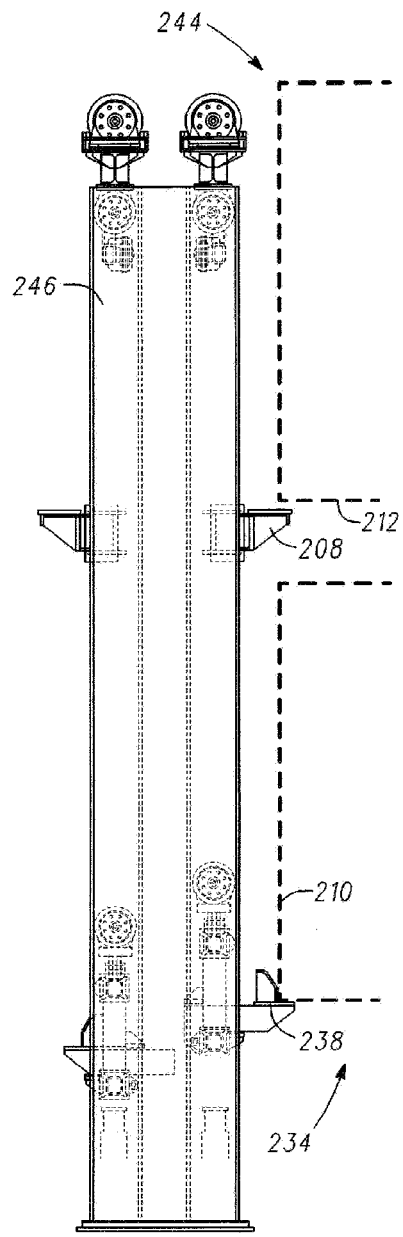
FIG. 10
FIG. 11

DISTRIBUTION SYSTEM

FIELD OF THE INVENTION

This invention relates to transportation and logistics industry, and more particularly to a distribution system.

BACKGROUND OF THE INVENTION

Freight transport continues to grow at a rapid pace, especially in the heavy-rail sector. Severe bottlenecks are seen in existing rail transfer terminals, which result in freight delays. Most such terminals have little or no right-of-way available for terminal expansion. Inefficiencies associated with moving containers from terminal to terminal by truck, to transfer between long-distance rail carriers (corridors), introduce significant delays, costs and inefficiencies. Further, truck activity on urban and suburban freeways cause increased fuel consumption and pollution emissions.

In connection with transportation logistics, market forces are driving the development of new technologies to improve the efficiency of freight transfer operations at distribution facilities, rail and port terminals. There is a need to improve the efficiency of freight transfer operations at distribution facilities, rail and port terminals.

There is also a need for handling, handing off and exchanging freight with a high degree of automation and increased freight transfer efficiency. Additionally, an efficient operational solution in connection with terminals and distribution facilities is needed, whereby an overhead crane can be used to shuffle containers between trains, ships and container chassis, with minimal and efficient handling, such as a single touch.

Thus, there is a need for the development of new technologies to improve the efficiency of freight transfer operations at terminals and distribution facilities. For example, a distribution system that provides an enhanced system for handling containers and simplifying the picking and placement processes for a crane operator, and enables a process that allows a crane operator and truck operator to work substantially independently, and thus not requiring real time coordination and hand-offs between them, would be considered an improvement in the art.

BRIEF DESCRIPTION OF THE DRAWINGS

FIG. 3 provides a multi-level pathfinder with a containment cavity having a ground level cell and an elevated level cell, the containment cavity is configured to receive containers, with the ground level cell being shown loaded and populated. The container is supported by a movable shelf in a support position in the ground cell. In the event of bottom loading, the chassis would have just vacated the ground cell, for example.

FIG. 4 shows a container supported by a movable shelf in a support position in an elevated cell slightly above an elevated support mechanism shown in a stowed position.

FIG. 5 shows a container supported by a movable shelf in a support position in an elevated cell slightly above an elevated support mechanism shown in a support position.

FIG. 6 shows the elevation support mechanism in a support position, providing support of the container in the elevated cell, ready for pick up by a crane. The movable shelf is shown being lowered to the ground level cell, for receiving the next container hand off.

FIG. 7 shows both the ground level cell and the elevated level cell being populated with containers. The elevation support mechanism is in a support position, providing support for the top container and the movable shelf is shown supporting the bottom container in a support position.

FIGS. 10-12 are rear, side and top views of an alternate embodiment of a hoisting carriage (or movable shelf) driven by motors and a pulley like structure of the distribution system, in accordance with the instant invention.

DESCRIPTION OF A PREFERRED EMBODIMENT

Figure 1:
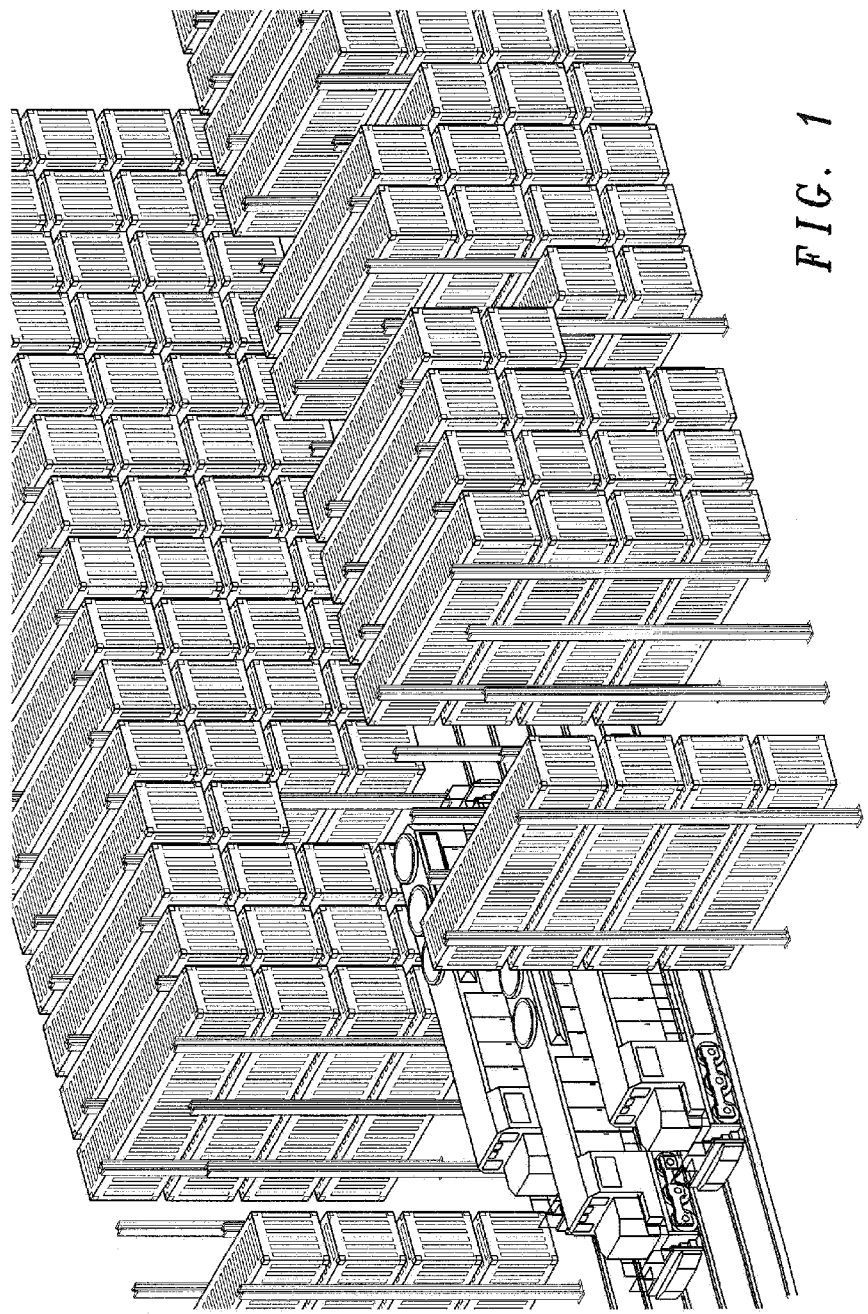
FIG. 1 is an elevated perspective view of an embodiment of a distribution system, in accordance with the instant invention.
Figure 2:
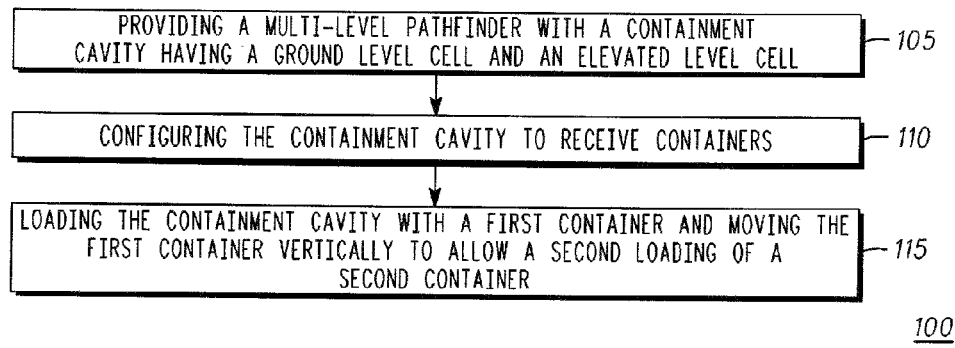
FIG. 2 is a flow diagram of an embodiment of the distribution system, in accordance with the instant invention.

Referring to FIGS. 1 and 2, an embodiment of a distribution system is shown in connection with a multi-layer pathfinder. The distribution system 100 can include the steps of: providing 105 a multi-level pathfinder with a containment cavity having a ground level cell and an elevated level cell; configuring 110 the containment cavity to receive containers; and loading 115 the containment cavity with a first container and moving the first container vertically to allow a second loading of a second container.

Advantageously, the system provides an enhanced system for handling containers and simplifies the picking and placement processes for a crane operator and enables a process that does not require real time coordination between a crane operator and truck driver, thus facilitating the process and making the operation more efficient.

The term "container" as used herein can include the combination of a container and chassis, in certain embodiments. As should be understood by those skilled in the art, the multi-layer container can be used to handle and buffer not only containers by themselves, but also those connected to a chassis as well.

The loading step 115 allows top loading from an elevated level by use of a crane or bottom loading generally at a ground level via a chassis, and is thus particularly adapted for improved productivity.

The configuring step 110 includes the containment cavity being adapted and complementarily configured to receive a conventionally dimensioned container, for improved versatility in loading and handling operations.

In a preferred arrangement, the loading and moving in step 115 can include providing movable shelves configured to provide vertical movement and support of the first container, and in an event of a top loading, lowering the movable shelf sufficiently to allow subsequent population, and in the event of a bottom loading, raising the movable shelf sufficiently to allow subsequent population, for enhanced handling and productivity.

The distribution system 100 can further include sensing and displaying proper alignment of a container, prior to the moving step. Advantageously, this feature can assist a crane operator when top loading and a truck operator when ground loading.

The distribution system 100 can further include actuating the multi-level pathfinder prior to the moving step, to be in a position to allow receipt of another container, to allow manual operation. And an automation feature is provided in one embodiment, which includes sensing proper alignment of a container and actuating the moving step, if properly aligned, to be in position to allow receipt of another container.

In a preferred embodiment, an elevation support mechanism is provided, for maintaining support of the first container at a desired elevation.

In another embodiment, the distribution system 100, can include the steps of: providing 105 a multi-level pathfinder with a containment cavity having a ground level cell and an elevated level cell; configuring 110 the containment cavity to receive containers; and loading 115 and populating at least one of the ground level cell and the elevated level cell with a container and moving the first container vertically to the other of the at least one of the elevated level cell and the ground level cell, respectively, to allow subsequent loading of an unpopulated cell. The system provides improved and efficient handling of containers.

This embodiment accommodates top loading from an elevated level or bottom loading generally at a ground level, for enhanced versatility.

In one embodiment, automation is provided by sensing proper alignment of a container and actuating the moving step, if properly aligned, to be in position to allow subsequent loading of an unpopulated cell.

In one arrangement, the providing step 105 includes placing the multi-level pathfinder in proximity to at least one of a distribution center, rail terminal and port terminal, for simplified and efficient operation.

Figure 8:
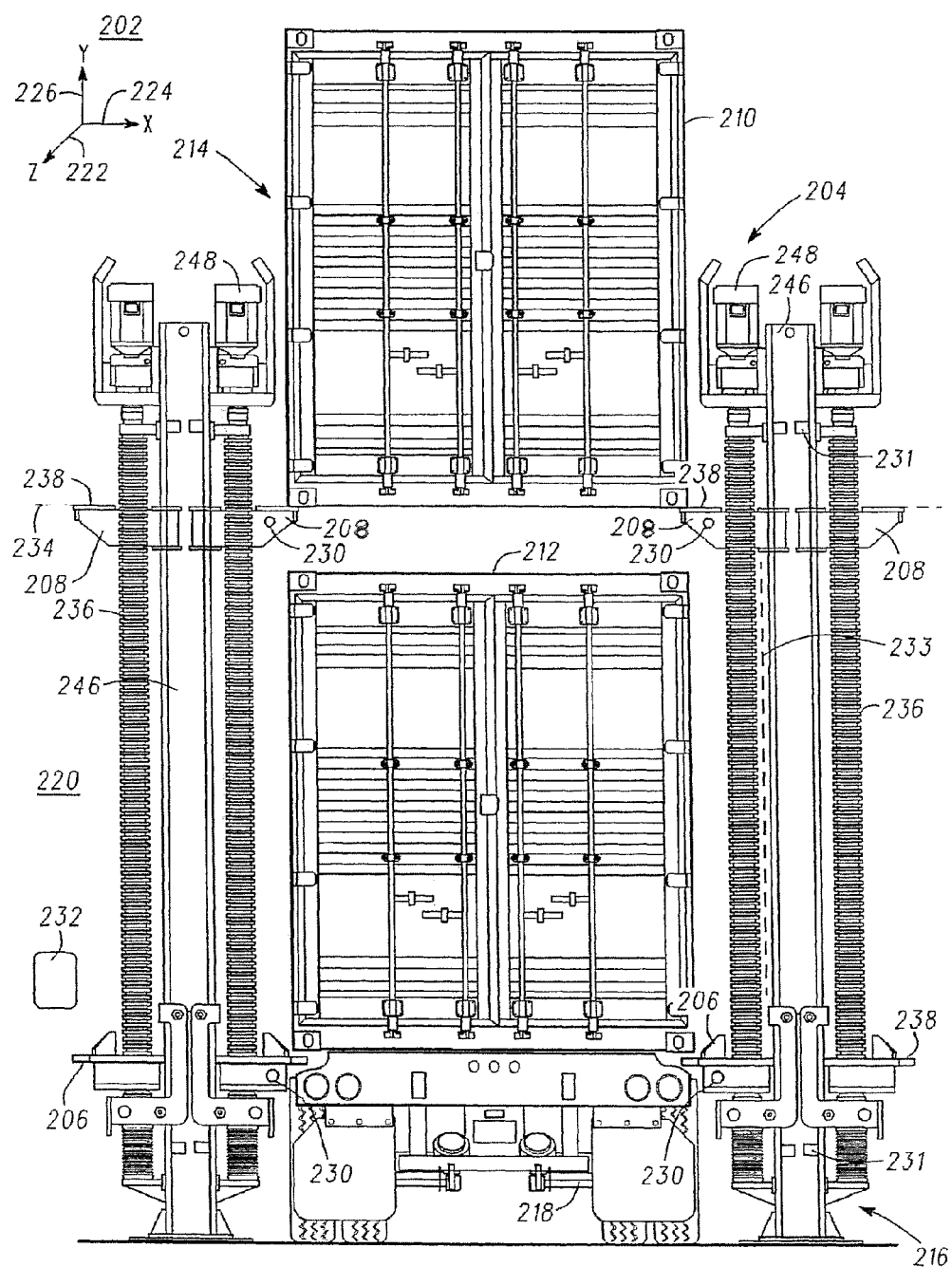
FIG. 8 is a front view of the distribution system, showing a multi-level pathfinder populated with a container on the elevation support mechanism and a container on a chassis populated on a movable shelf in the ground cell, in accordance with the instant invention.

As shown in FIG. 8, in one embodiment, the distribution system 200 includes: a multi-level pathfinder 202 with a containment cavity 204 being configured to receive containers 210 and 212; the containment cavity 204 having a ground level cell 234 and an elevated level cell 244; and a movable shelf 206 configured to be able to move between the ground level cell 234 and the elevated level cell 244, such that once populated with a container the movable shelf 206 is moved to one of the ground level cell 234 and the elevated level cell 244, to allow receipt of a subsequent container in an unpopulated cell.

The containment cavity 204 is configured to receive a container at, at least one of an elevated level for top loading and populating and a generally ground level for bottom loading and populating, as desired.

In one arrangement, the containment cavity is configured to receive a container at, at least one of an elevated level via a crane defining top loading, and a ground level via a tractor chassis, defining a bottom loading, and in the event of a top loading, the movable shelf 206 can be utilized to lowered the container sufficiently to allow subsequent top loading and populating, and in the event of the bottom loading, the movable shelf 206 is elevated sufficiently to allow subsequent ground loading and population.

In an automated embodiment, the multi-level pathfinder 202 can include at least one of: a sensor to sense proper alignment of a populated container and an actuator 832 for actuating the movable shelf 206, if properly aligned, to allow receipt of another container. These features provide an enhanced and a more efficient operation.

In one embodiment, the actuator 232 can be utilized to activate the elevation support mechanism 208 to move from an unsupported or stowed position to a supported position for providing support of a container at a desired elevation, or visa versa. This feature allows the movable shelf 206 to move freely in a vertical direction and provides a stationary support once a container is in place, for an enhanced operation.

As best shown in FIG. 8, in one embodiment the containment cavity 204 is configured to receive a container at an elevated level 214 or a ground level 216, preferably, via a crane and a ground level via a tractor chassis 218, with a chassis carrying a container as shown, respectively. For example, in the event of top loading from the elevated level 214, once the multi-level pathfinder 202 is populated with a first container 210 sitting on the elevated support mechanism 208, the movable shelf 206 picks up the container 210 above the elevated support mechanism 208, the elevated support mechanism 208 is retracted to a stowed position and the movable shelf 206 is lowered sufficiently to allow subsequent populating on the elevated support mechanism 208.

In the event of bottom loading at a generally ground level 216, the multi-level pathfinder 202 is populated with a first container 210 on the movable shelf 206, it is elevated by the movable shelf 206 to a position above the elevated support mechanism 208, the support mechanism is moved from a stowed position to a support position, and a container is placed on the elevated support mechanism 808. The movable shelf is then lowered and positioned at a ground level for populating a subsequent container on the movable shelf 806. This provides a versatile structure and process for handing off containers inbound and outbound.

In one arrangement, the multi-level pathfinder 202 in FIG. 8 includes at least one sensor, and preferable a plurality of such sensors 830, to sense proper alignment of a container in the containment cavity 204 being integrated in and with the movable shelf 206 and elevated support mechanism 208. This allows operators to work more efficiently, when placing and loading containers from the ground level 216 typically by a truck operator or from an elevated level 214 typically by a crane operator. For example, if an operator does not receive an indication of proper alignment from the sensors 230 in the movable shelve 206 and elevated support mechanism 208, he or she can re-load a container and/or further investigate. As should be understood, the sensors herein are fed to a processor for monitoring of the pathfinder and providing a display and alert system for tracking location of containers, misalignment, etc.

As detailed previously herein, in a preferred embodiment additional sensors can be utilized as well. As shown in FIG. 8, sensors 231, such as upper and lower sensors, and linear sensor 233 can be used to provide location and elevation sensing of the movable shelf 206, for improved automation and monitoring of alignment, progress of populating, loading and moving in connection with the system 200 system, for example. Signals from these sensors can be fed to a processor and displayed for operators, such as truck, crane and terminal operators for monitoring and analysis, etc. Likewise, position sensors 235 can be used to monitor whether the elevated support mechanism 208 is in a stowed or unstowed position, for enhanced automation, as best shown in FIG. 8.

In FIG. 8, the multi-level pathfinder 202 further includes support pads 238 on the movable shelves 206 and elevated support mechanism 208, for padding and dampening the contact, when raising and/or lowering containers.

As detailed previously, in one arrangement, the multi-level pathfinder 202 includes an actuator 232 for actuating the movement of the movable shelf 206 up or down. It can also have a de-actuation button to de-actuate the pathfinder 202. The actuator 232 can be positioned near the pathfinder 202 or remotely, for use by an terminal, truck or crane operator and can be connected wirelessly. Additionally, the pathfinder 202 can be programmed to raise and/or lower as appropriate, once one or more of the sensors have sensed and provided proper indications that it is appropriate to continue the method, such as when the container is determined to be in appropriate alignment and the containment cavity 204 has been vacated by humans, etc. and the chassis and/or crane has been moved away, such that shelf movement can begin or continue in an unobstructed manner, in accordance with the system 100.

Figure 9:
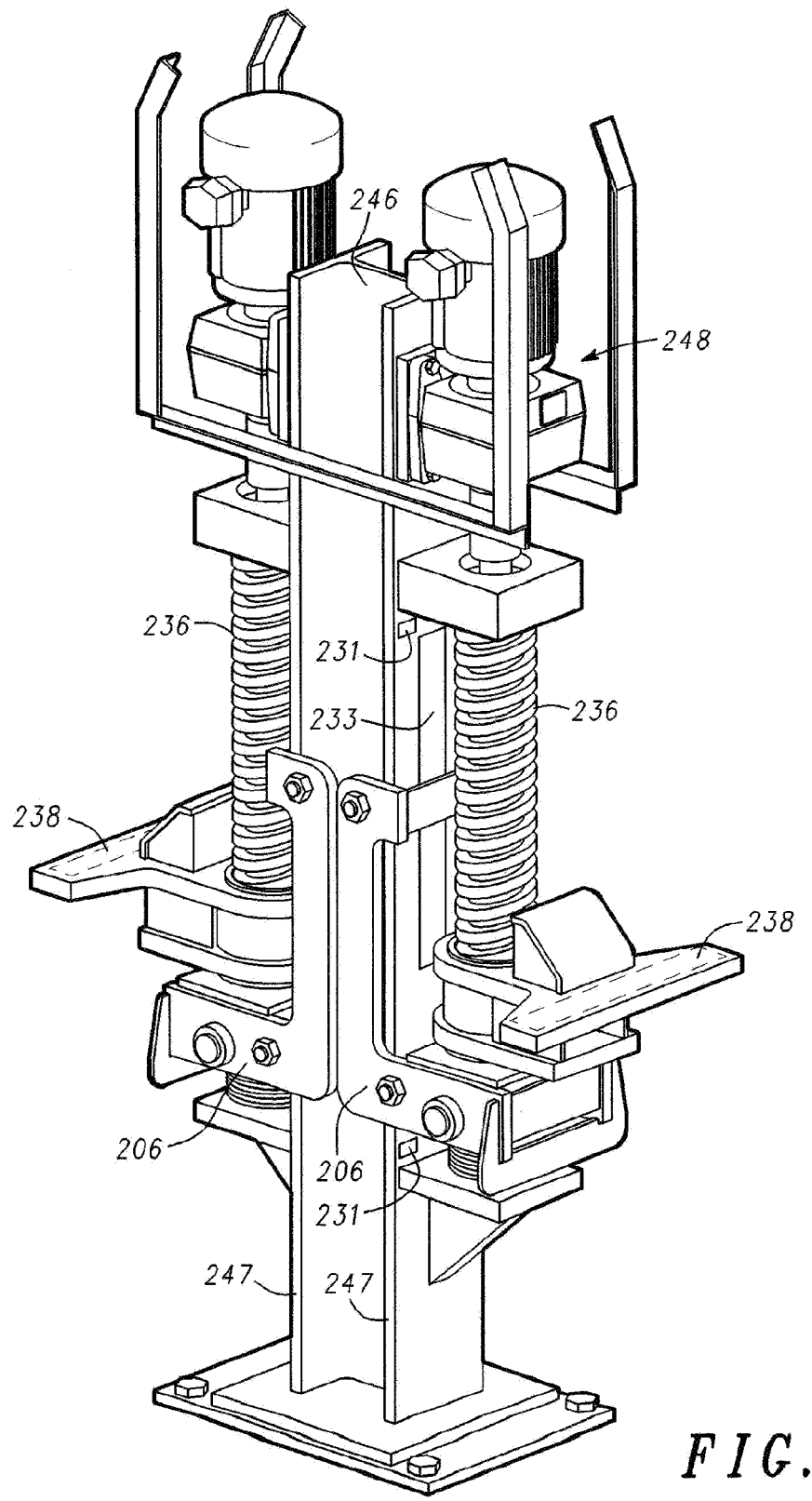
FIG. 9 is an elevated perspective view of an embodiment of a hoisting carriage (or movable shelf) driven by motors and a screw like structure of the distribution system, in accordance with the instant invention.

In a preferred embodiment as shown in FIGS. 8 and 9, the pathfinder 202 includes additional important structure to function efficiently and enable the system 100. For example, the containment cavity 204 includes a ground and elevated cell 234 and 244, screw like structures 236 on each of four vertical support structures or columns 246, such as in the form of I beam(s) defining a vertical track for the movable shelf 206 to travel along, support pad(s) 238 shown in phantom, pivotable and retractable elevated support mechanisms 208 and an elevator mechanism 248, shown as individual electric motors shown in the FIG. 9, which are connected to the screws 236 to rotate and move each movable shelf 206 up or down along the track provided by the respective support column 246, as desired.

Figure 12:
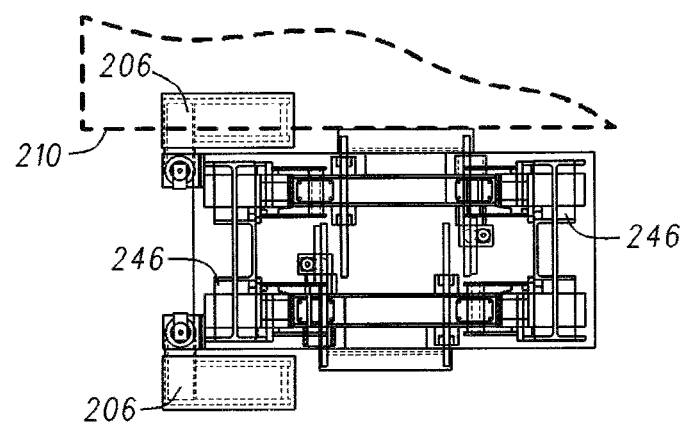

FIGS. 10-12 are rear, side and top views of an alternate embodiment of a hoisting carriage (or movable shelf) driven by motors and a pulley like structure of the distribution system. For example, the containment cavity 204 includes a ground and elevated cell 234 and 244, pulley structures 250 on each of four vertical support structures or columns 246, such as in the form of I beam(s), defining a vertical track 247 for the hoisting carriage or movable shelf 206 to travel along, support pad(s) 238 shown, pivotable and retractable elevated support mechanisms 208 and an elevator mechanism 248, shown as individual electric motors, which are connected to the pulley structures 250 to move each movable shelf 206 up or down along the track provided by each respective support column 246, as desired.

Figure 15:
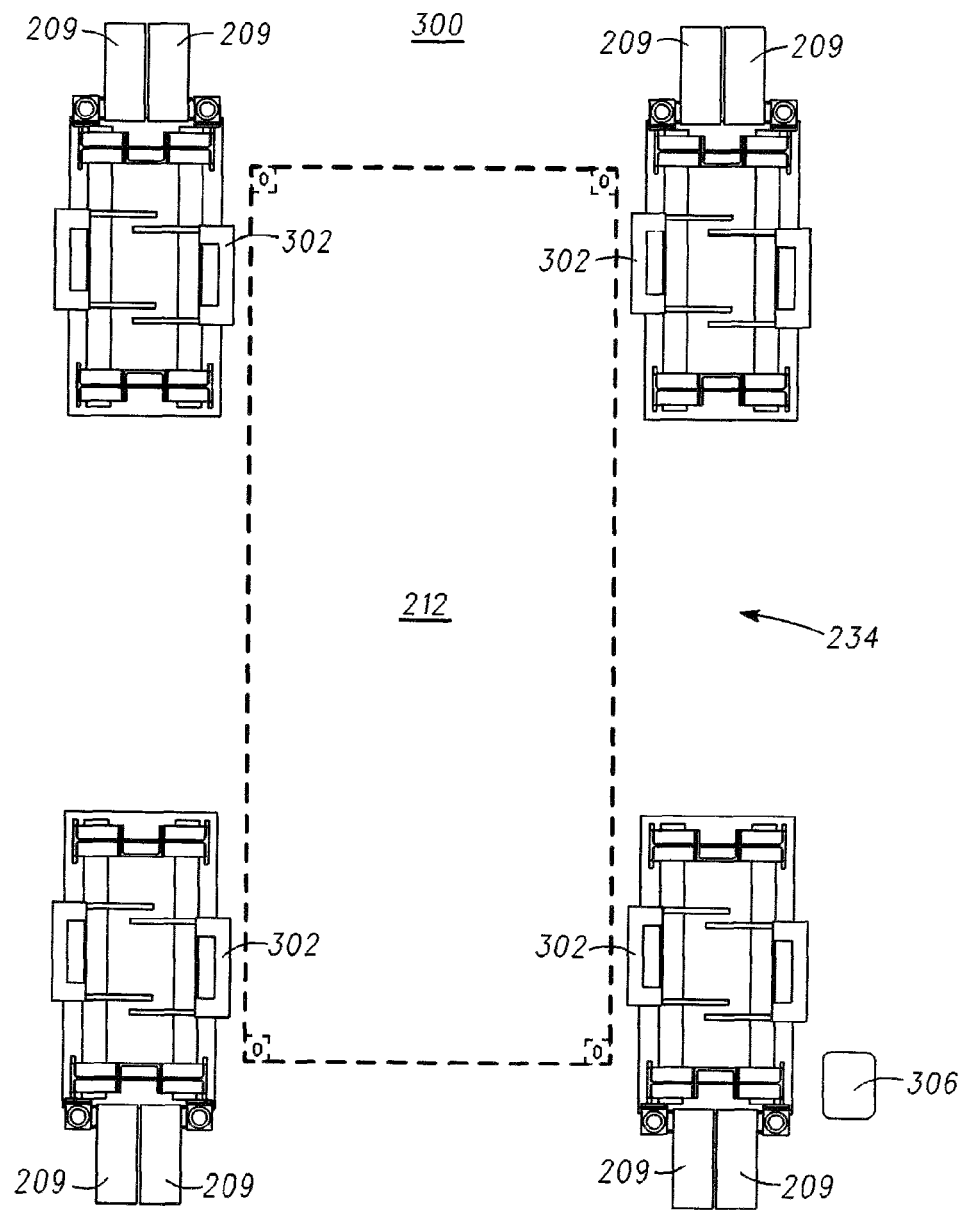
FIG. 15 is a simplified top view of the distribution system, showing a multi-level pathfinder in the process of being populated with a container on a chassis (not shown) on a movable shelf in the ground cell, the movable shelf being in an unsupported position for simplified egress, and an elevated support mechanism is shown in a stowed position, in accordance with the instant invention.

FIG. 15 is a simplified top view of the distribution system 300, showing a multi-level pathfinder in the process of being populated with a container 212 on a chassis (not shown) on a movable shelf or hoist carriage 206 in the ground cell 234. The movable shelf 206 is shown in an unsupported position 302 in FIG. 15, for simplified egress, and in a support position 304 in FIG. 16. Also illustrated is the elevated support mechanism 208 in a stowed position 209.

A control pad 306 or manual control box is shown. It should be located for easy access by a truck driver, for example. It can typically include: control buttons for up-hoist and down-hoist, operating lights, slot for keycard, movable shelf 206 side latch in (supported position 304) and out (unsupported position 302) control keys and pathfinder serial number.

As should be understood by those skilled in the art, many of the operational steps detailed herein, can be automated or semi-automated and can be actuated by: use of keycards, smartcard, proximity card, radio, keyfob, cellphone, computing device (wired or wireless) and the like.

The type of container that will be handled by the pathfinder/buffer can be automatically determined by the operator of the crane and sometimes the truck driver. The operators of the crane and truck can manually control the crane or buffer, or can using automatic control, through the use of circuitry and sensors, as detailed herein. As should be understood, automatic controls can include RF signals communicating between the crane and the pathfinder and/or between the truck operator and the pathfinder.

Figure 13:
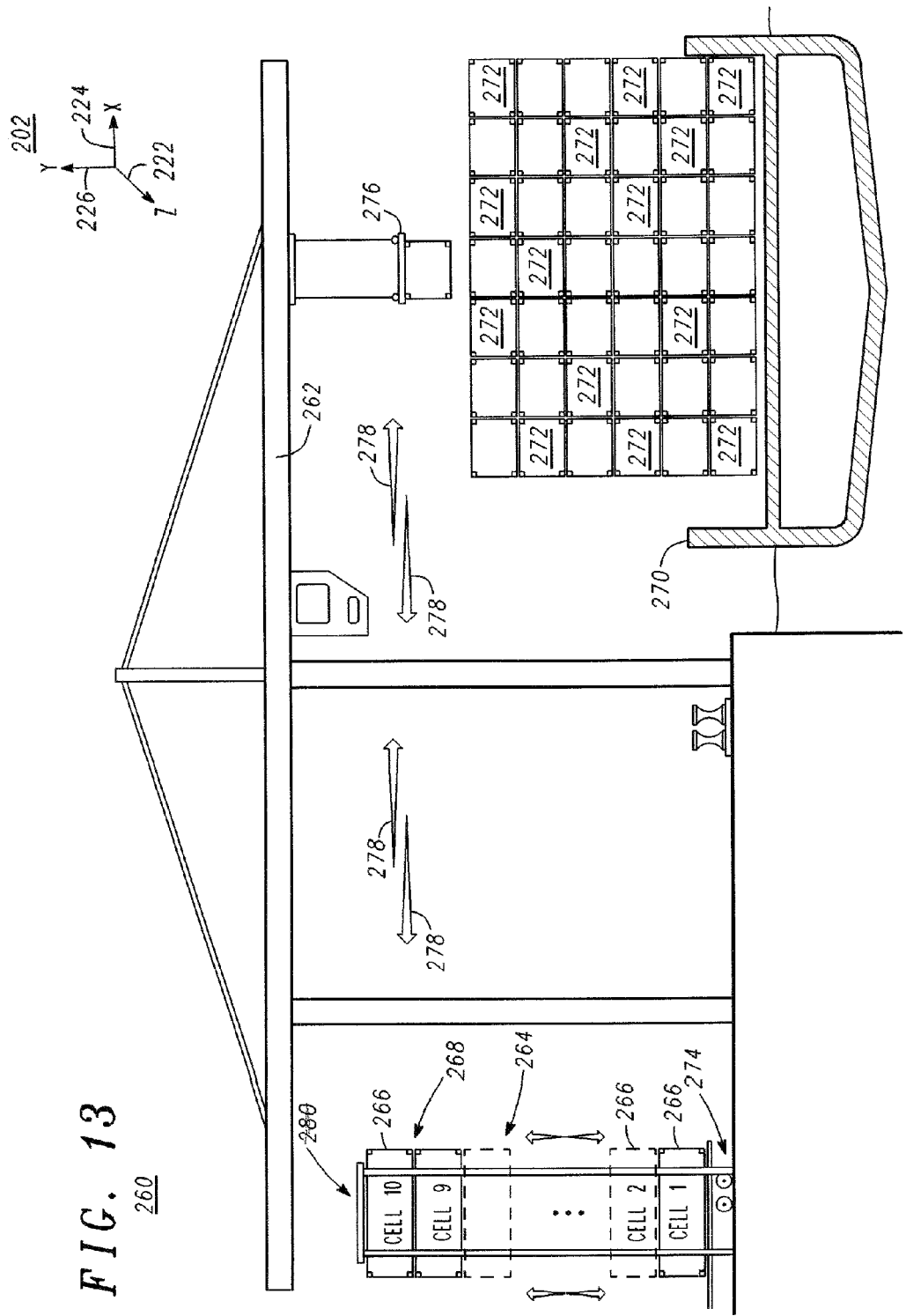
FIG. 13 is a front view of an embodiment of the distribution system, showing a multi-level pathfinder adapted for use in a port application, in accordance with the instant invention.
Figure 14:
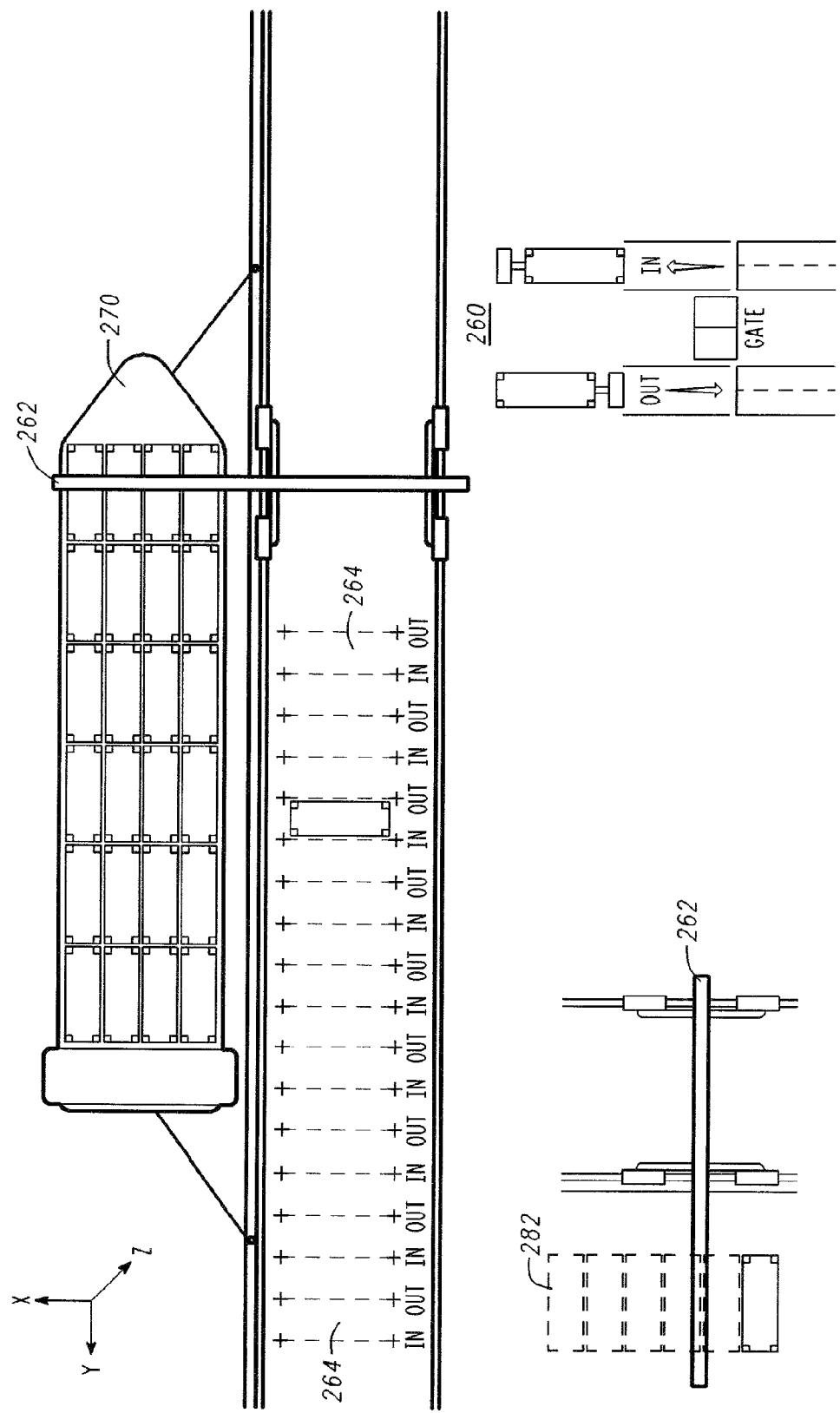
FIG. 14 is a top view of the distribution system in FIG. 13, showing a multi-level pathfinder adapted for use in a port application, in accordance with the instant invention.

Moving to FIGS. 13 and 14, simplified front and top views of an embodiment of the distribution system for use in a port terminal 260 are shown.

The system can include an overhead ship to shore crane 262, a multi-level pathfinder 264 with ten cells 266 and containers 268, and a vessel 270 with containers 272. FIG.13 shows a containment cavity 274 being generally perpendicular with respect to the vessel 270, to minimize the footprint and facilitate handoffs of containers. Advantageously, the pathfinder 264 is adapted to do most if not all of the raising and lowering movement of containers, so that the crane operator can focus on trolleying 278 (along the x-axis 224 in FIG.13) and carrying containers by the use of a spreader 276 and minimal hoisting (up/down movement of containers along the y-axis 226) with respect to the pathfinder 264, thus simplifying the handoff process. In a preferred embodiment, remote site pathfinders 282 can be strategically located at a lower congestion site, for example, for remote storage, longer term storage, blocking, special transportation needs, etc. for improved efficiencies, logistics and utilization of the available real estate.

The multi-level pathfinder 264 finds particular application when located, configured or positioned in proximity to a distribution center or terminal, such as a rail terminal or port terminal 260. The terminal 260 is shown with an x-axis (longitudinal) 224, y-axis (latitudinal) 226 and z-axis (elevational) 222. In this embodiment, the containment cavity 204 is positioned substantially adjacent to a port, at a port side location, at an angle of about at least ten or more degrees with respect to the z-axis 222, and more preferably at an angle of about ninety degrees from the z-axis 222, so as to minimize the necessary space or footprint and to simplify and facilitate transporting containers to and from the multi-level pathfinder 264, from any direction, for example, for enhanced handing of containers.

EXAMPLES

Provided below are brief examples of possible operating sequences for pathfinders being transported in inbound and outbound directions. This can include two or more high cells. In the inbound direction in a terminal application, containers would typically be unloaded from double stack railroad cars to pathfinders, as shown in FIG. 1.

Example 1

Two High Buffer

Figure 3:
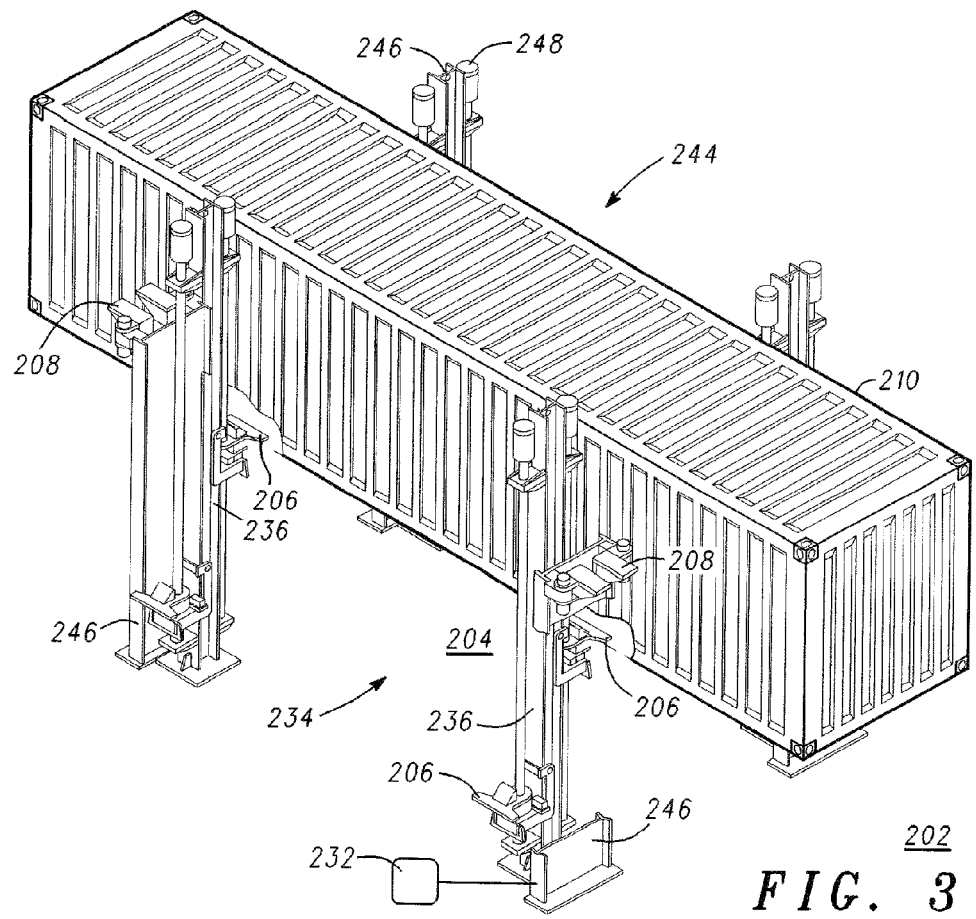
FIGS. 3-7 are simplified elevated perspective views of a sequence of steps relating to the distribution system in FIG. 2.
Figure 4:
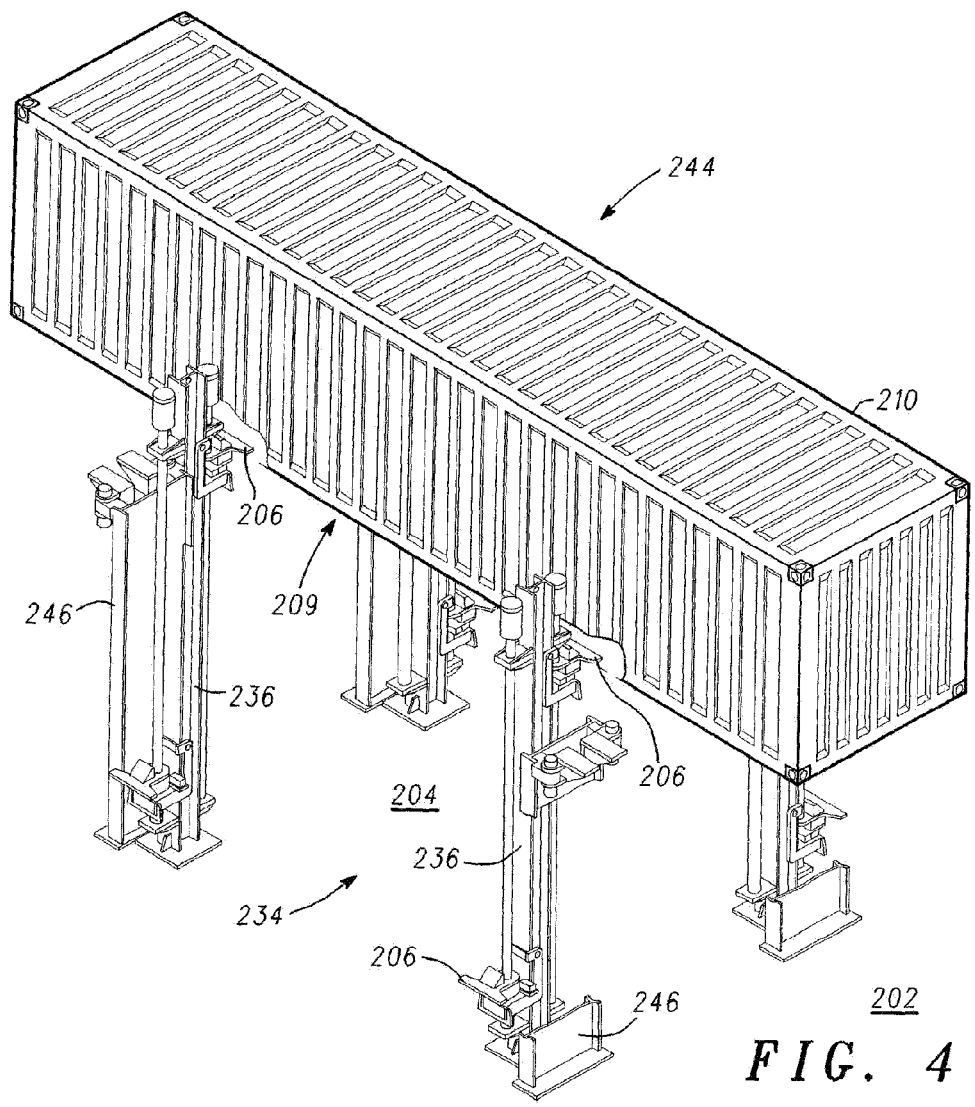
Figure 5:
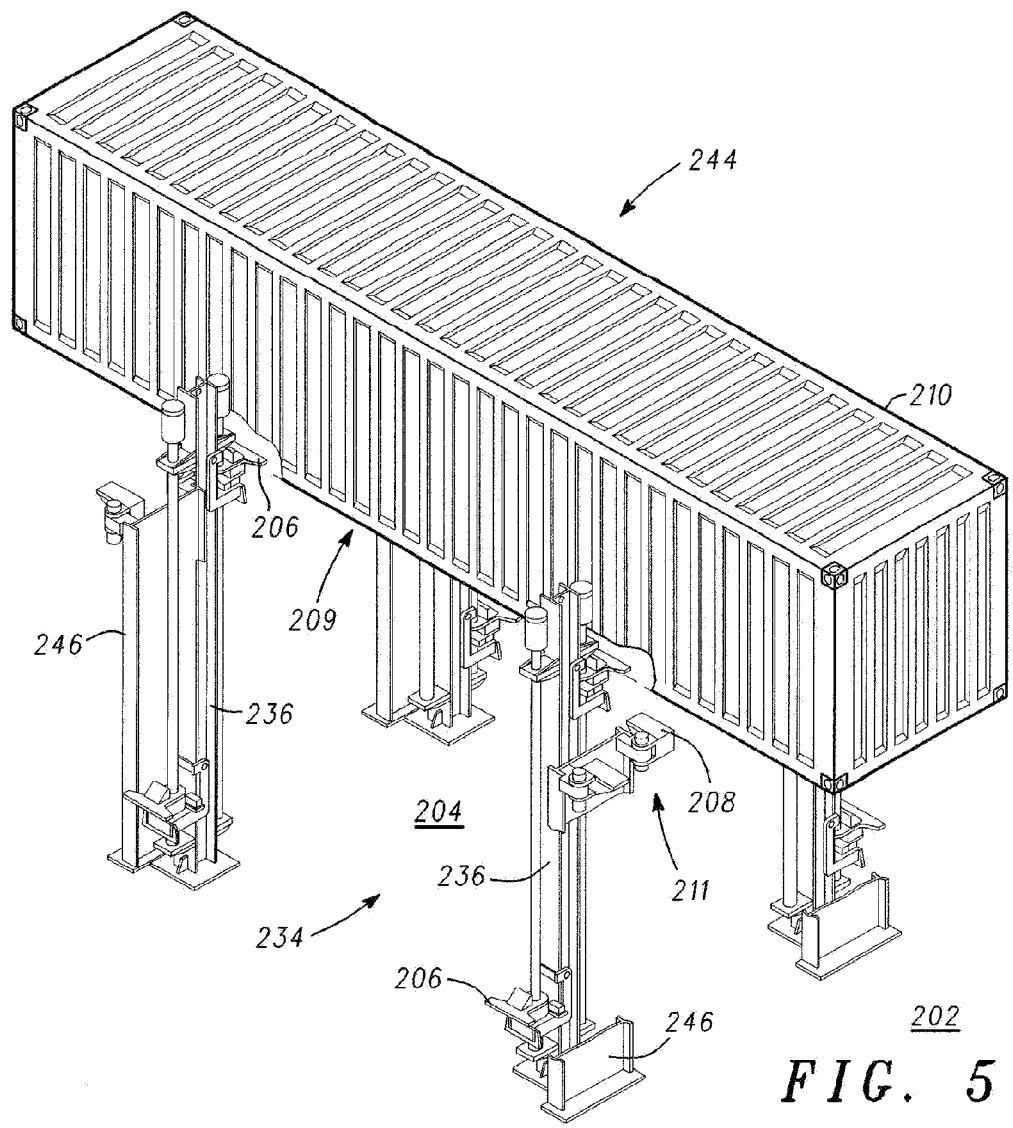
Figure 6:
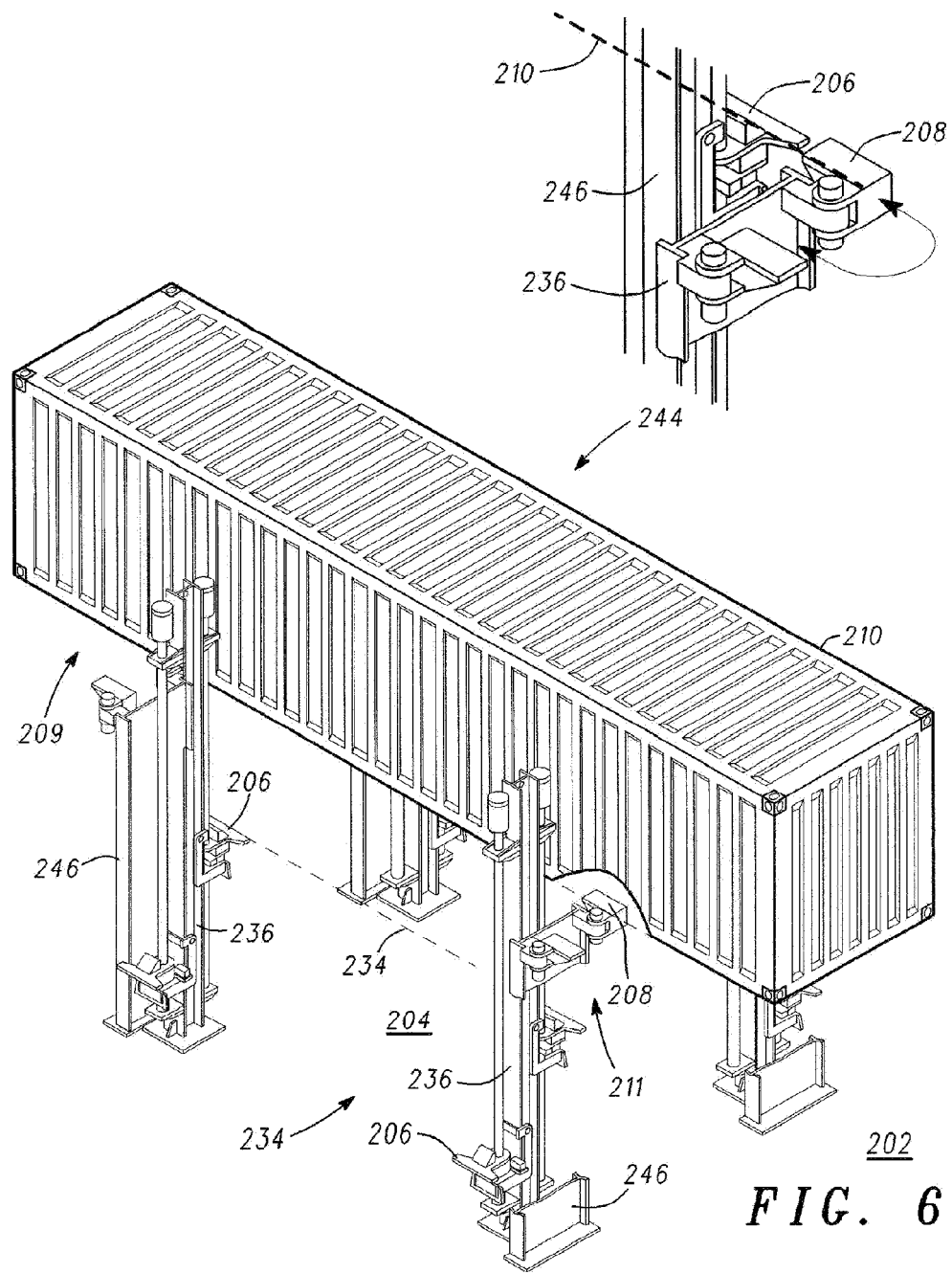

An inbound operation can operate in a similar manner as an outbound operation, but in reverse order. As an example, a crane operator picks up a container with a spreader and places/deposits and releases the inbound container in a top cell (No. 2) on an elevated support mechanism 208, preferably four of them, in a support position, as shown in FIG. 6. As soon as the container is released on the elevated support mechanism 208, the shelf 206 is raised to cell No. 2 and elevated slightly above the elevated support mechanism 208 to lift and support the container above cell No. 2's elevated support mechanism 208, as shown in FIG. 5. After the weight is off the elevated support mechanism 208 of cell No. 2, the elevated support mechanism 208 is stowed and cleared out of the way, as shown in FIG. 4, allowing the container to be lowered down to the ground level cell (No. 1), as shown in FIG. 3. In Cell No. 1, the container is held at approximately four feet from the ground level so that a truck line carrier chassis can back in and accept the container in the ground cell No 1.

Figure 7:
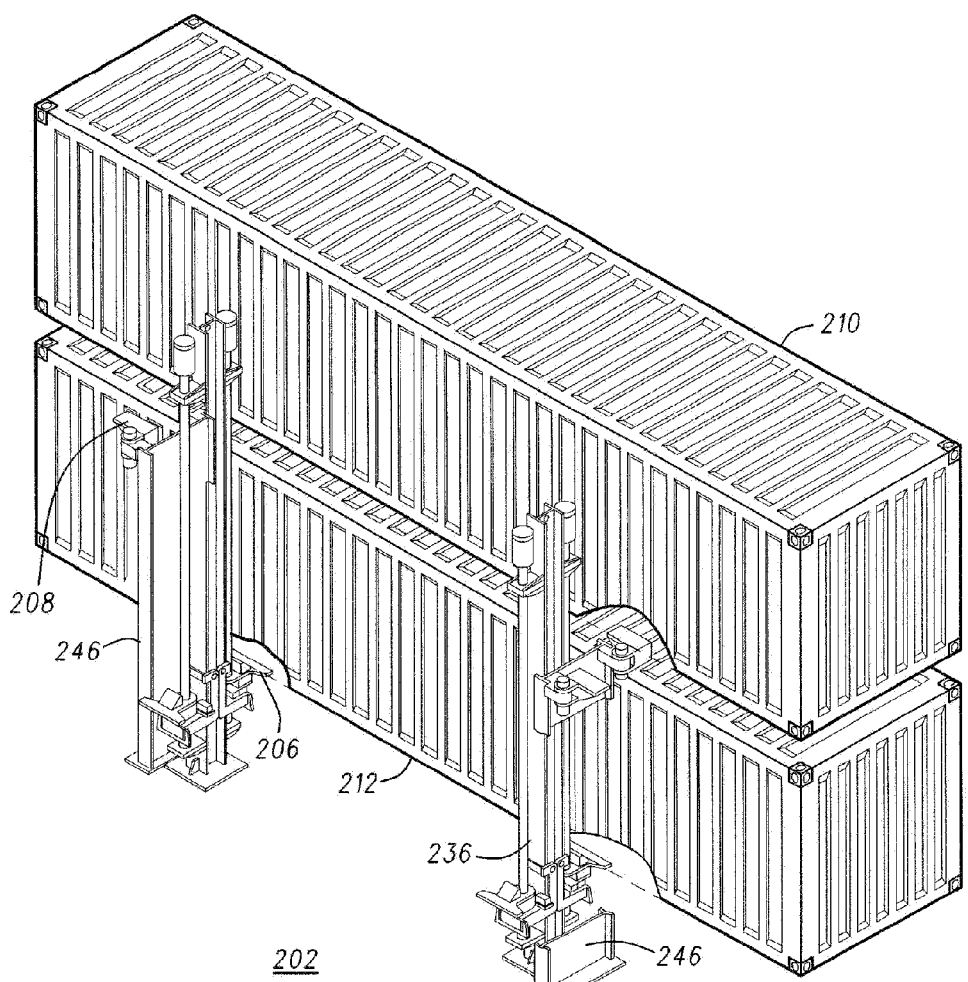

After the container is in cell No. 1 position, the elevated support mechanism 208 in cell No. 2 can be automatically extended and placed in a support position to receive the next inbound container from a crane's spreader, as shown in FIG. 7. Once cell No. 1 container is removed and the chassis has cleared from the Pathfinder, the movable shelf 206 again is elevated to the top cell and lifts the container slightly above the elevated support mechanism 208 (FIG. 5). The elevated support mechanism 208 is then retracted (FIG. 4) so that the container can be lowered to the bottom cell (No. 1) position, as detailed previously. Note that the movable shelf 206 used to lift the container can also be used to hold the container in the bottom position until a truck line carrier chassis arrives at the designated Pathfinder for pick up.

This general sequence can also apply to higher high rise Pathfinders with three or more cells, however additional elevated support mechanisms 208 are provided for each of the additional cells above the ground level cell, as should be understood by those skilled in the art.

Example 2

Three High Buffer

A spreader connected to a crane removes an inbound container from a double stack car, transfers the container to top-cell No. 3 of a pathfinder buffer and places and releases the container on cell No 3's elevated support mechanism 208, which is in a support position. Next, the movable shelf 206 hoists or lifts the container slightly up. When the weight of the container is released from cell No. 3's elevated support mechanism 208, the elevated support mechanism 208 is retracted or stowed, to allow the container to be lowered down to cell No. 1 (bottom cell). Next, hoisting arms of the movable shelf 206 are retracted or moved to an unsupported position 302 and raised up stopping just below a new container on support mechanism 208 in cell No. 3. The movable shelf 206 is placed in the support position 304 and slightly lifts the container above the support mechanism 208 in cell No. 3. The support mechanism 208 in cell 3 is stowed and the container is lowered to cell 2 support mechanism 208 for temporary storage until cell No. 1 is available. The support mechanism 208 in cell No. 3 is next placed in a support position 211 for population of the next container.

Concurrently or later, a truck line carrier chassis can enter into cell No. 1. The container in that cell can next be lowered in place with the movable shelf 206 when in a support position 304. Once placed on a chassis, the movable shelf 206 is moved to an unsupported position 302, to allow the chassis and container to exit the pathfinder. Once the chassis exits, a next chassis can enter cell No. 1 and receive a subsequent container, from cell No. 1, 2 or 3.

Example 3

Loading Two High Buffer

The following examples describe an outbound operation from pathfinder to double stack railroad car.

Figure 16:
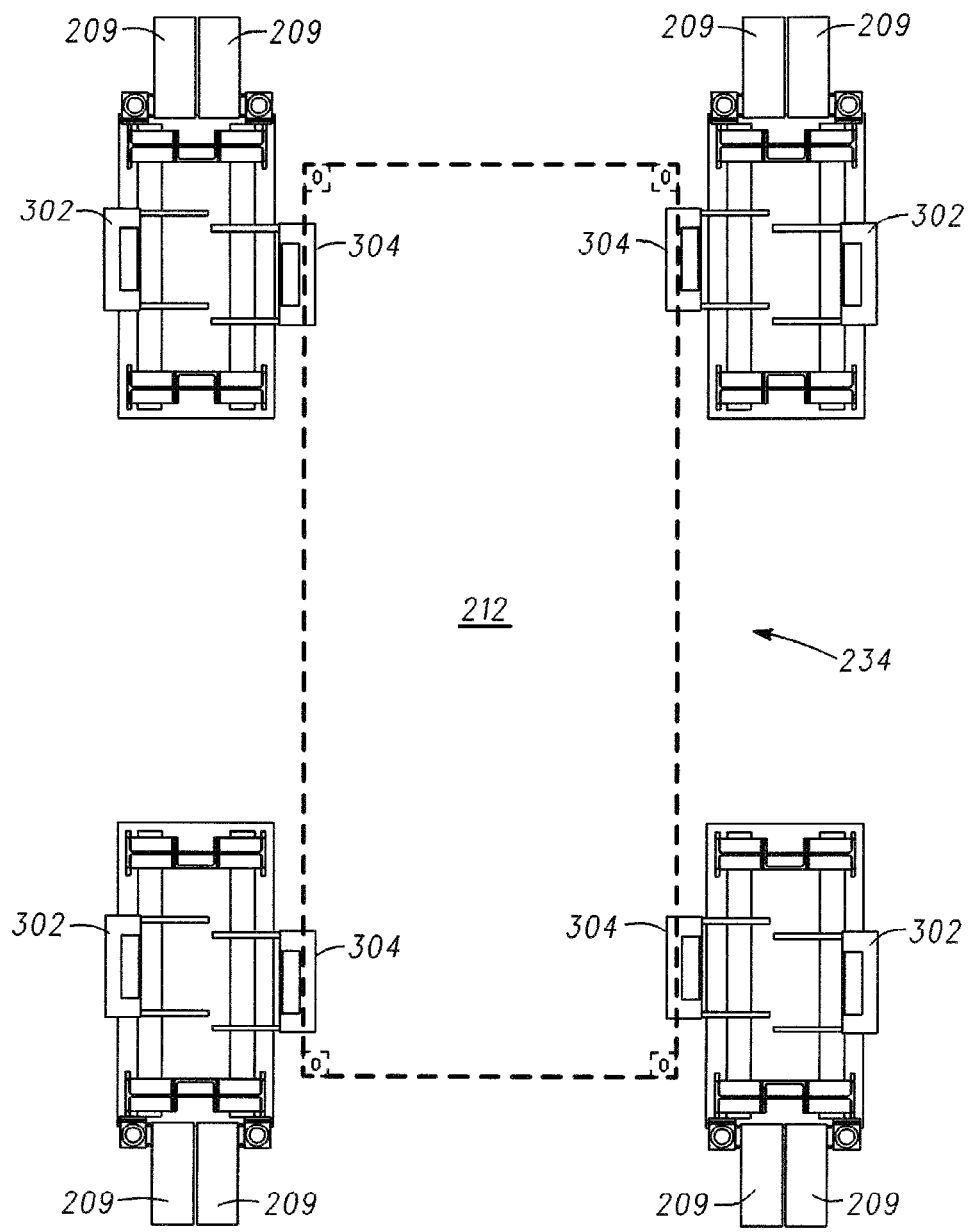
FIG. 16 is a simplified top view of the distribution system, showing a multi-level pathfinder populated with a container on a movable shelf in the ground cell, the movable shelf being in a support position supporting the container, and an elevated support mechanism is shown in a stowed position, in accordance with the instant invention.

A truck line carrier chassis or flat bed with a container enters cell No 1. This can also be referred to as bottom loading. Once cell No. 1 is populated at about ground level 216, the multi-level pathfinder 202 is populated with a first container 210 on the movable shelf 206. Initially, the movable shelf 206 is at an unsupported position for easy access into cell No. 1, as shown in 302 (FIG. 15.) Second, the movable shelf 206 is moved to a supported position 304 (FIGS. 16 and 3). In Cell No. 1, the container is held at approximately four feet from the ground level. Third, the movable shelf 206 in the supported position 304 (which is extended inwardly), is elevated with a container to a position above the elevated support mechanism 208 (FIG. 4). Fourth, the support mechanism 208 is moved from a stowed position 209 in FIG. 4 to a support position 211 in FIG. 5. Fifth, the container is placed on the elevated support mechanism 208 by lowering the movable shelf 206 slightly, to place the container on the support mechanism 208. The movable shelf 206 is then moved to an unsupported position 302 (outwardly) and is then lowered and positioned at a ground level for populating a subsequent container on the movable shelf 206. This provides a versatile and automatable buffer structure particularly adapted for efficient processing and handing off containers inbound and outbound.

This general sequence can also apply to higher high rise Pathfinders with three or more cells, however in such embodiments, additional elevated support mechanisms 208 are provided for each cell.

Example 4

Loading an Outbound Train with a Three Story Buffer

First a container is delivered to the bottom cell and is automatically raised to the top cell No. 3, via the movable shelf 206 in the supported position 304 (FIGS. 16 and 3). Next, the movable shelf 206 in the supported position 304, is elevated with a container to a position above the elevated support mechanism 208 (FIG. 4) in cell No. 3. Next, the support mechanism 208 is moved from a stowed position 209 in FIG. 4 to a support position 211 in FIG. 5 in cell No. 3. The container is placed on the elevated support mechanism 208 by slightly lowering the movable shelf 206, to place the container on the support mechanism 208 in cell No. 3. The movable shelf 206 is then moved to an unsupported position 302 (outwardly) and is then lowered and positioned at a ground level for populating a subsequent container on the movable shelf 206. The second container is moved to cell No. 2 and stored on cell No. 2's elevated support mechanism 208, as described in Example 3. Then cell No. 1 is read for populating. This provides a versatile and automatable buffer structure particularly adapted for efficient processing and handling of containers inbound and outbound.

As should be understood by those skilled in the art, various steps can be modified to meet the flow of containers in and out.

Conventional known terminals that are in existence today do not provide the advantages described herein.

All in or outbound traffic can by orchestrated, directed and dispatched, by the gate personnel substantially error free with location tracking, wireless and computing technology.

Keycards and the self-service nature of the system improve driver and crane operator productivity, and truck, buffer and crane utilization and efficiency.

A truck line carrier can easily load or unload a container to or from a pathfinder buffer, while sitting in his or her cab by pressing a control button to operate the buffer. As should be understood, other means of actuation are contemplated and within the scope of this invention.

When a container is delivered for outbound, for best efficiencies, it is designated to deliver the container at the appropriate corridor at track side, for pre-blocking.

Most if not all in or outbound containers arriving at the terminal can be temporarily stored in a pathfinder buffer, at track or port side.

The self service nature and operation can improve load pick up dwell times and load drop off dwell times over conventional terminals, which often require waiting or dead time.

Keycards and various wireless devices can be can be used for access and exiting and actuation of pathfinders. The system includes timing devices to assist in investigating terminal thefts. The keycards can be retained for future reference or investigations.

Since the overhead gantry crane operator does not have to wait for chassis delivery trackside or portside, truck and crane operators can work independently, thus substantially reducing gating issues or unnecessary delays.

Any container coming into the terminal whether it arrives by train or truck is only required to be handled once by the terminals overhead cranes.

Terminal and distribution centers can realize enormous driver and chassis productivity gains, and eliminate bobtails and empty trips.

As should be understood by those skilled in the art, various modifications and alterations can be made without departing from the spirit and scope of this invention.

What is claimed is:

1. A distribution system, comprising:
   a first and second column displaced from one another by a first distance;
   a third and fourth column displaced from one another by the first distance, and aligned with and separated from the first and second columns, respectively, by a second distance that is greater than the first distance, so as to define a rectangular containment cavity;
   each of said columns including an elevated support mechanism pivotally attached to the column at a first height, defining an upper cavity above the elevated support mechanisms and a lower cavity below the elevated support mechanisms, wherein the elevated support mechanisms are moveable between a support position configured to support a container, and a stowed position;
   each of said columns further including a moveable shelf configured for movement throughout a range of positions up and down the column between the upper cavity and the lower cavity wherein each of said moveable shelves includes a support pad configured to support a container and is adapted to receive and move a container between the lower cavity and the upper cavity for transfer to one of an overhead crane and a ground vehicle.

2. The containment cavity of claim 1, wherein the first and second moveable shelves are further configured to automatically move a container to the upper cavity when the container is in the lower cavity and no container is in the upper cavity.

3. The containment cavity of claim 2, wherein the moveable shelves are configured to move the container above the elevated support mechanisms while the elevated support mechanisms are in their stowed position, and wherein the moveable shelves are configured to subsequently lower the container onto the elevated support mechanisms after the elevated support mechanisms move from their stowed positions to their support positions.

4. The containment cavity of claim 1, wherein the moveable shelves are further configured to move to the upper cavity when a container is in the upper cavity and no container is in the lower cavity.

5. The containment cavity of claim 4, wherein the moveable shelves are configured to raise the container above the elevated support mechanisms, and lower the container into the lower cavity after the elevated support mechanisms move to the stowed position.

6. The containment cavity of claim 1, wherein the elevated support mechanisms are configured to be in the stowed position when there is no container in the upper cavity.

7. A distribution system, comprising:
   a plurality of vertical support structures defining a plurality of containment cavities;
   each of the plurality of vertical support structures having a vertically movable shelf and at least one container support platform pivotally attached to the vertical support structures, distal to a bottom of the vertical support structures;
   the at least one container support platform defining a ground level cell below the support platform and an elevated level cell above the support platform; and
   each of the vertically moveable shelves configured to be movable throughout a range of positions between the ground level cell and the elevated level cell, wherein each of the vertically moveable shelves are adapted to receive and move a container between the ground level cell and the elevated level cell for transfer to one of an overhead crane and a ground vehicle.

8. The system of claim 7 wherein the distribution system includes a sensor, wherein the sensor is configured to monitor alignment of a container with respect to the containment cavity.

9. The system of claim 8, wherein the system includes an actuator for actuating the movable shelves to allow receipt of another container if the sensor senses the container is properly aligned with the vertical support structures.

10. The system of claim 7 wherein the containment cavity is configured to receive a container at an elevated level.

11. The system of claim 7 wherein the containment cavity is configured to receive a container at an elevated level via a crane and at a ground level via a tractor trailer, and in the event of the elevated level, each movable shelf is lowered to allow subsequent populating, and in the event of the ground level, each movable shelf is elevated to allow subsequent population.

12. The system of claim 7 wherein the system is in proximity to at least one of a distribution center, rail terminal and port terminal.

13. The system of claim 7 wherein the vertical support structure includes an actuator for moving an elevation support mechanism from an unsupported position to a support position for providing support of a container.

14. A distribution system, comprising:
- a container storage structure with first and second vertical support structures displaced from one another by a first distance and defining a containment cavity;
- the first and second vertical support structures having respective first and second elevated support mechanisms attached thereto at a fixed height, thereby defining a ground level cell below the support mechanisms and an elevated level cell above the support mechanisms said support mechanisms being movable between a stowed position and a support position; and
- first and second vertically moveable shelves each attached to the respective first and second vertical support structures, and each configured for movement throughout a range of positions between the ground level cell and the elevated level cell, wherein the first and second shelves are adapted to receive and move a container between the ground level cell and the elevated level cell for transfer to one of an overhead crane and a ground vehicle.

15. The system of claim 14 wherein the containment cavity is configured to receive the container at, at least one of an elevated level and a generally ground level.

16. The system of claim 14 wherein the containment cavity is configured to receive the container at, at least one of an elevated level via a crane and a ground level via a tractor trailer.

17. The system of claim 14 wherein the containment cavity is configured to receive the container at, at least one of an elevated level via a crane and a ground level via a tractor trailer, and in the event of the elevated level, the movable shelves are lowered sufficiently to allow subsequent populating, and in the event of the ground level, the movable shelves are elevated sufficiently to allow subsequent population.

18. The system of claim 14 wherein the container storage structure is in proximity to at least one of a distribution center, rail terminal and port terminal.

19. The system of claim 14 wherein the container storage structure includes a sensor, wherein the sensor is configured to monitor alignment of a container with respect to the containment cavity and an actuator for actuating the movable shelves to allow receipt of another container if the sensor senses the container is properly aligned with the containment cavity.

20. The system of claim 14 wherein the elevated support mechanisms are pivotally attached and the container storage structure includes an actuator for pivoting the elevation support mechanisms from an unsupported position to a support position for providing support of a container at a desired elevation.

\* \* \* \* \*